United States Patent [19]

Okuno et al.

[11] Patent Number: 5,726,549

[45] Date of Patent: Mar. 10, 1998

[54] SENSOR-LESS CONTROL APPARATUS FOR PERMANENT MAGNET SYNCHRONOUS MOTOR

[75] Inventors: Tomoya Okuno; Hiroyuki Sakakibara, both of Nishio; Hiroya Tsuji; Kazuyoshi Obayashi, both of Kariya, all of Japan

[73] Assignees: Nippondenso Co., Ltd., Kariya; Nippon Soken, Inc., Nishio, both of Japan

[21] Appl. No.: 599,132

[22] Filed: Feb. 9, 1996

[30] Foreign Application Priority Data

Feb. 10, 1995 [JP] Japan .................... 7-046361
Nov. 24, 1995 [JP] Japan .................... 7-329732

[51] Int. Cl.$^6$ .................................................. H02P 1/46
[52] U.S. Cl. ........................ 318/721; 318/722; 318/724; 318/723
[58] Field of Search ........................ 318/798–821, 318/700–724

[56] References Cited

U.S. PATENT DOCUMENTS

| | | | |
|---|---|---|---|
| 4,275,343 | 6/1981 | Fulton et al. | 318/721 |
| 4,703,245 | 10/1987 | Sakamoto et al. | 318/723 X |
| 4,772,830 | 9/1988 | Kobari et al. | . |
| 4,868,479 | 9/1989 | Byong-Ho et al. | 318/721 |
| 5,038,092 | 8/1991 | Asano et al. | 318/811 |
| 5,057,759 | 10/1991 | Ueda et al. | 318/616 |
| 5,225,759 | 7/1993 | Endo et al. | . |
| 5,231,338 | 7/1993 | Bulgarelli et al. | . |

FOREIGN PATENT DOCUMENTS

| | | |
|---|---|---|
| 58-036188 | 3/1983 | Japan . |
| 62-055398 | 11/1987 | Japan . |
| 63-039490 | 2/1988 | Japan . |
| 63-129886 | 6/1988 | Japan . |
| 63-186588 | 8/1988 | Japan . |
| 1-234090 | 9/1989 | Japan . |
| 2-211089 | 8/1990 | Japan . |
| 3-183394 | 8/1991 | Japan . |
| 4-251592 | 9/1992 | Japan . |
| 5-034918 | 5/1993 | Japan . |
| 6-014794 | 2/1994 | Japan . |
| 60-42795 | 6/1994 | Japan . |
| 7-123775 | 5/1995 | Japan . |

OTHER PUBLICATIONS

Watanabe, et al: "A Sensorless Detecting Strategy of Rotor Position and Speed on Permanent Magnet Synchronous Motor," T. IEE Japan, vol. 110–D, No. 11, 1990, pp. 1193–1200.

*Primary Examiner*—David S. Martin
*Attorney, Agent, or Firm*—Cushman, Darby & Cushman IP Group of Pillsbury, Madison & Sutro LLP

[57] ABSTRACT

A sensor-less control apparatus is designed for a permanent magnet synchronous motor having multiple-phase armature windings and a rotor. The sensor-less control apparatus includes a first device for calculating a rotational angle and an angular velocity of the rotor from phase currents and phase voltages of the armature windings. A second device is operative for controlling energizations of the armature windings in response to the rotational angle and the angular velocity calculated by the first device. A third device is operative for correcting the rotational angle calculated by the first device into a correction-resultant rotational angle and informing the second device of the correction-resultant rotational angle, and for feeding back information of the correction-resultant rotational angle to the first device. A fourth device contained in the third device is operative for low-pass-filtering the rotational angle calculated by the first device and changing the rotational angle into a filtering-resultant rotational angle. A fifth device contained in the third device for, in cases where a previous rotational angle outputted from the fourth device and the rotational angle calculated by the first device are not in a same period, correcting the previous rotational angle into a correction-resultant previous rotational angle and informing the fourth device of the correction-resultant previous rotational angle.

7 Claims, 10 Drawing Sheets

SENSOR-LESS CONTROL APPARATUS FOR PERMANENT MAGNET SYNCHRONOUS MOTOR

BACKGROUND OF THE INVENTION

1. Field of the Invention

This invention relates to a sensor-less control apparatus for a permanent magnet synchronous motor.

2. Description of the Prior Art

It is known to control a permanent magnet synchronous motor without using any positional sensor. In one example of known sensor-less speed control, the rotor position and the speed of a permanent magnet synchronous motor are determined on the basis of the instantaneous values of phase voltages and phase currents, and drive of the motor is adjusted in response to the determined rotor position and the determined speed.

Japanese published unexamined patent application 4-251592 discloses a control apparatus for wheel-driving motors of an electrically-powered vehicle. In Japanese application 4-251592, the wheel-driving motors use brushless DC motors without magnetic pole position sensors respectively. The rotational speeds of the wheel-driving motors are determined on the basis of currents fed thereto, and the magnetic pole positions in the motors are estimated from the determined rotational speeds. The wheel-driving motors are controlled in response to the estimated magnetic pole positions.

In a typical example of known sensor-less speed control of a permanent magnet synchronous motor, an inverter generates phase currents in response to the output signal of a PWM (pulse width modulation) control circuit. The inverter feeds the generated phase currents to the motor. The phase currents and related phase voltages are monitored. A calculator estimates the rotor position in the motor from the monitored phase currents and the monitored phase voltages. The PWM control circuit is directly or indirectly informed of the estimated rotor position. The output signal of the PWM control circuit depends on the estimated rotor position. Accordingly, the phase currents fed to the motor are adjusted in response to the estimated rotor position. The PWM control circuit tends to disturb the waveforms of the phase currents. The disturbance in the waveforms of the phase currents causes an error in the estimated rotor position.

SUMMARY OF THE INVENTION

It is an object of this invention to provide an improved sensor-less control apparatus for a permanent magnet synchronous motor.

A first aspect of this invention provides a sensor-less control apparatus for a permanent magnet synchronous motor having multiple-phase armature windings and a rotor, the apparatus comprising first means for calculating a rotational angle and an angular velocity of the rotor from phase currents and phase voltages of the armature windings; second means for controlling energizations of the armature windings in response to the rotational angle and the angular velocity calculated by the first means; third means for correcting the rotational angle calculated by the first means into a correction-resultant rotational angle and informing the second means of the correction-resultant rotational angle, and for feeding back information of the correction-resultant rotational angle to the first means; fourth means contained in the third means for low-pass-filtering the rotational angle calculated by the first means and changing the rotational angle into a filtering-resultant rotational angle; and fifth means contained in the third means for, in cases where a previous rotational angle outputted from the fourth means and the rotational angle calculated by the first means are not in a same period, correcting the previous rotational angle into a correction-resultant previous rotational angle and informing the fourth means of the correction-resultant previous rotational angle.

A second aspect of this invention is based on the first aspect thereof, and provides a sensor-less control apparatus further comprising sixth means for adding a corrective value to the rotational angle outputted from the third means, the corrective value being proportional to the angular velocity calculated by the first means.

A third aspect of this invention is based on the first aspect thereof, and provides a sensor-less control apparatus wherein the fourth means uses a filter constant which depends on the angular velocity calculated by the first means.

A fourth aspect of this invention is based on the first aspect thereof, and provides a sensor-less control apparatus wherein the fifth means is operative for, in cases where the previous rotational angle outputted from the fourth means and the rotational angle calculated by the first means are not in a same period between $-\pi$ radian and $\pi$ radian, adding $-2\pi$ radian to the previous rotational angle for normal rotation of the rotor and adding $2\pi$ radian to the previous rotational angle for reverse rotation of the rotor.

A fifth aspect of this invention is based on the first aspect thereof, and provides a sensor-less control apparatus wherein the fourth means comprises a digital filter equivalent to an analog filter of a 1-order delay type.

A sixth aspect of this invention provides a sensor-less control apparatus for a permanent magnet synchronous motor having multiple-phase armature windings and a rotor, the apparatus comprising first means for detecting phase currents which flow through the armature windings; second means for estimating an angular velocity of the rotor from the phase currents detected by the first means, and generating a first signal representing the estimated angular velocity; third means for correcting the first signal into a second signal through given signal processing which corresponds to a low pass filter; fourth means for estimating a rotational angle of the rotor from the phase currents detected by the first means, and generating a third signal representing the estimated rotational angle; fifth means for correcting the third signal into a fourth signal through given signal processing which corresponds to a low pass filter; and sixth means for controlling the phase currents in response to the second signal and the fourth signal.

A seventh aspect of this invention is based on the sixth aspect thereof, and provides a sensor-less control apparatus further comprising seventh means for controlling the fifth means in response to the second signal.

DESCRIPTION OF THE PREFERRED EMBODIMENTS

First Embodiment

Figure 1:
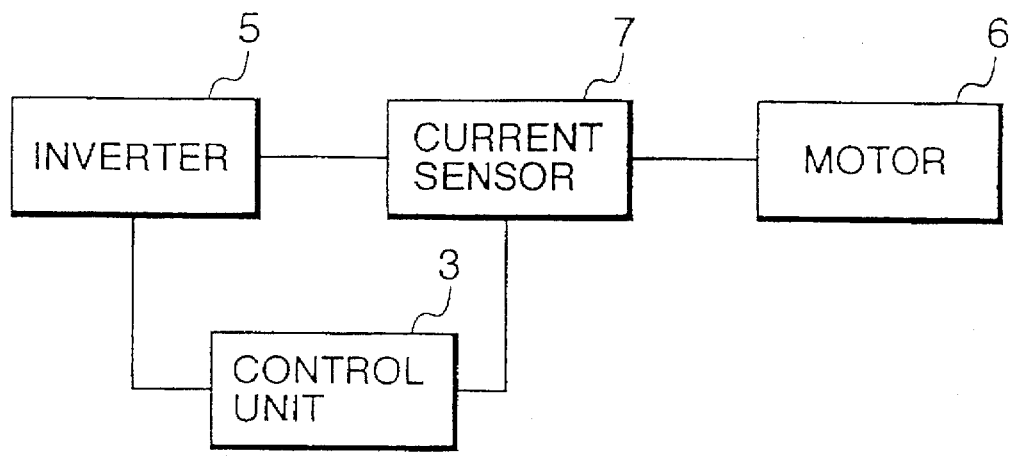
FIG. 1 is a block diagram of a sensor-less control apparatus for a permanent magnet synchronous motor according to a first embodiment of this invention.

With reference to FIG. 1, a control unit 3 receives a signal representative of a command torque (a target torque) from a suitable device (not shown). An inverter 5 feeds phase currents iU, iV, and iW to armature windings of a permanent magnet synchronous motor 6 respectively. Therefore, the rotor in the motor 6 rotates in response to the phase currents iU, iV, and iW. Current sensors 7 associated with two of current feed lines between the inverter 5 and the motor 6 detect the phase currents iU and iW, and output signals representing the detected phase currents iU and iW. The control unit 3 receives the output signals of the current sensors 7.

The control unit 3 generates control signals in response to the command torque and the detected phase currents iU and iW. The control unit 3 outputs the control signals to the inverter 5. The inverter 5 generates the phase currents iU, iV, and iW in response to the output signals of the control unit 3.

The control unit 3 includes a DSP (a digital signal processor), a microcomputer, or a similar device which has a combination of an input/output port (an interface), a processing section, a ROM, and a RAM. The control unit 3 operates in accordance with a program stored in the ROM. The program is iteratively executed at a given short period so that control implemented by the control unit 3 recurs at the same period. The input/output port contains a timer interface capable of generating and outputting PWM (pulse width modulation) waveform signals, A/D converters for changing analog signals into corresponding digital signals, and D/A converters for changing digital signals into corresponding analog signals.

Figure 2:
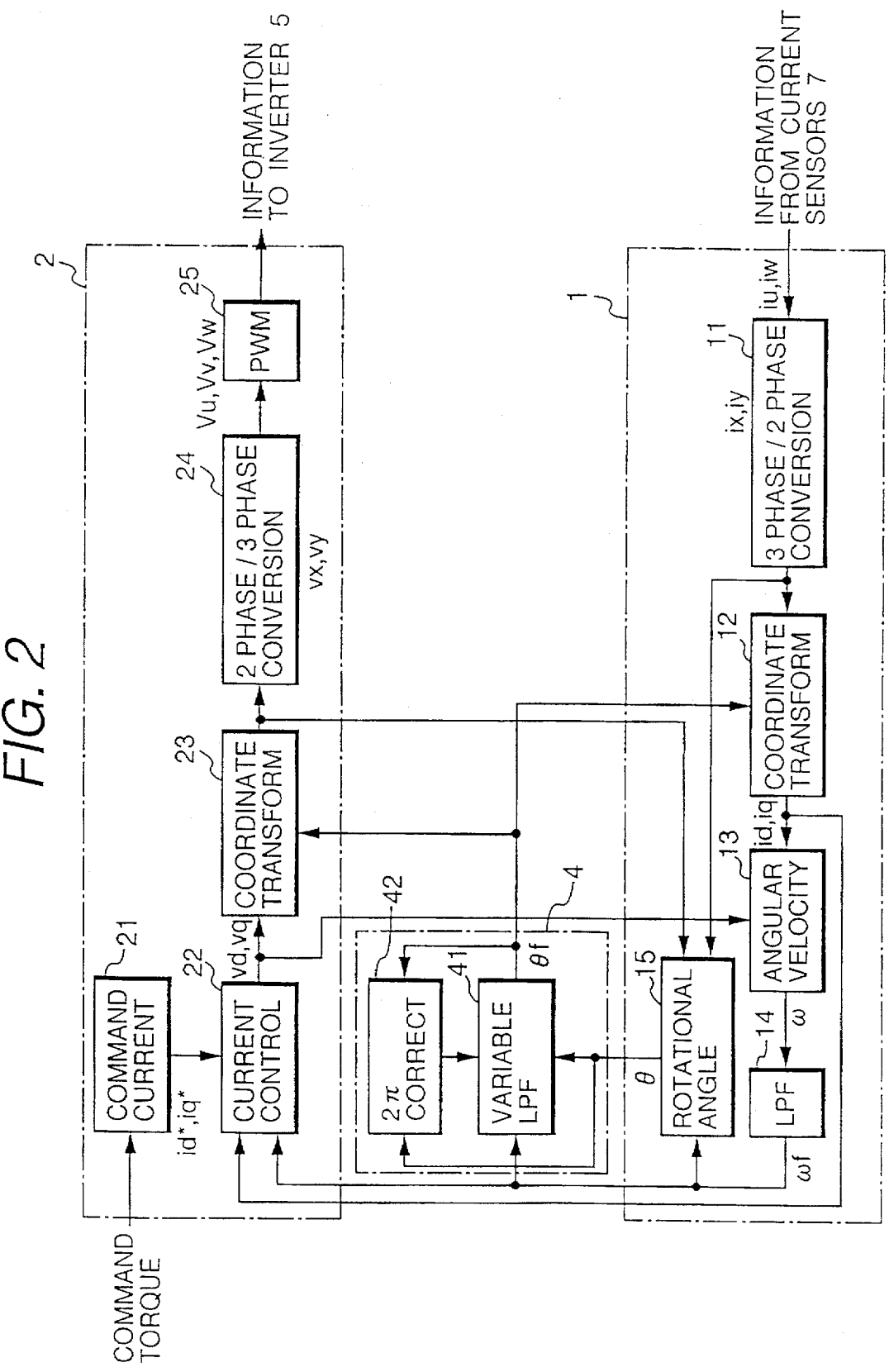
FIG. 2 is a diagram of the flow of operation of a control unit in FIG. 1.

FIG. 2 shows the flow of functions of the control unit 3. The functions of the control unit 3 are determined by software, that is, the previously-mentioned program. It should be noted that FIG. 2 does not show the hardware structure of the control unit 3.

With reference to FIG. 2, there are a calculating section 1, an energization controlling section 2, and a rotational angle correcting section 4. The calculating section 1 includes blocks 11, 12, 13, 14, and 15. The energization controlling section 2 includes blocks 21, 22, 23, 24, and 25. The blocks 11–15 and 21–25 in the calculating section 1 and the energization controlling section 2 can be provided by software in a DSP such as "TMS320C31" produced by Texas Instruments. The rotational angle correcting section 4 includes blocks 41 and 42.

With reference to FIGS. 1 and 2, the block 25 which is also referred to as the PWM block 25 generates energization signals in response to signals of command voltages (target voltages) VU, VV, and VW. The energization signals generated by the PWM block 25 are transmitted from the control unit 3 to the inverter 5. The inverter 5 generates three pulse currents (three phase currents iU, iV, and iW) in response to the energization signals, and feeds the generated pulse currents to the armature windings of the motor 6 respectively. Two phase currents iU and iW among the three phase currents are detected by the current sensors 7. The current sensors 7 generate signals representing the detected phase currents iU and iW. The current sensors 7 output the phase-current signals to the control unit 3.

Figure 3:
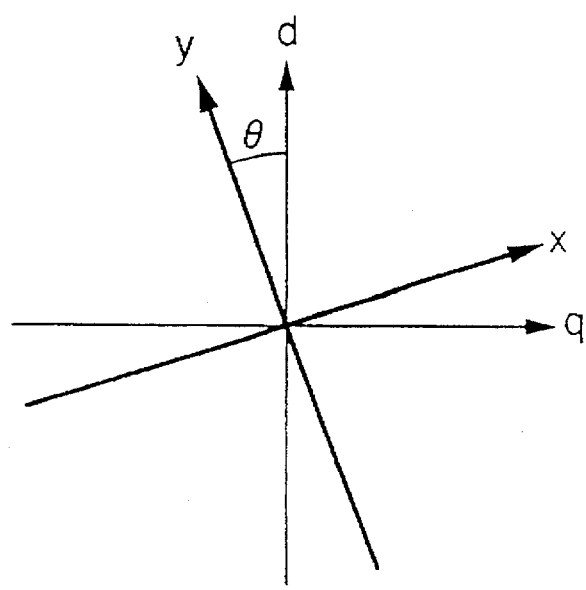
FIG. 3 is a diagram of the relation between different coordinate systems.

The block 11 which is also referred to as the 3-phase/2-phase conversion block 11 receives information of the detected phase currents iU and iW from the current sensors 7. The 3-phase/2-phase conversion block 11 calculates the other phase current iV from the phase currents iU and iW. The 3-phase/2-phase conversion block 11 changes the three phase currents iU, iV, and iW into two phase currents ix and iy defined in a given stationary orthogonal coordinate system x-y. As shown in FIG. 3, the orthogonal coordinate system x-y is angularly offset from a rotational orthogonal coordinate system d-q by an angle (a rotational angle) θ. The orthogonal coordinate system d-q moves together with the rotor in the motor 6.

The 3-phase/2-phase conversion block 11 informs the block 15 of the phase currents ix and iy. The block 15 is also referred to as the rotational angle calculation block 15. The block 15 is also informed of voltages Vy and Vx defined in the orthogonal coordinate system x-y. Furthermore, the block 15 is informed of an angular velocity ωf. The block 15 calculates a rotational angle θ from the phase currents ix and iy, the voltages Vy and Vx, and the angular velocity ωf by referring to the following equation.

$$\theta = \tan^{-1}\left\{ \frac{Vy - (Rd + pLd)iy + \omega fLqix - \omega fLdix}{-Vx + (Rd + pLd)ix + \omega fLqiy - \omega fLdiy} \right\} \quad (1)$$

where Rd denotes the winding resistance related to the d axis of the coordinate system d-q in an equivalent circuit of the motor 6; Ld and Lq denote the winding inductances related to the d axis and the q axis of the coordinate system d-q respectively; and p denotes a differential operator (d/dt). The block 15 receives information of the voltages Vy and Vx from the block 23 which is also referred to as the coordinate transformation block 23. The block 15 receives information of the angular velocity ωf from the block 14 which is also referred to as the fixed low pass filter block 14 or the fixed LPF block 14.

The block 41 which is referred to as the variable LPF block 41 receives information of the calculated rotational angle θ from the rotational angle calculation block 15. The variable LPF block 41 provides a digital filter equivalent to an analog low pass filter of a 1-order delay type. The variable LPF block 41 calculates a filtering-resultant rotational angle θf from the calculated rotational angle θ by referring to the following equation.

$$\theta f(n) = \frac{\theta(n) + a \cdot \theta f(n-1)}{1+a} \quad (2)$$

where "a" denotes a variable filter constant; the adscript "n" indicates that the related value is provided in the current period of control, that is, the current execution cycle of the program; and the adscript "n−1" indicates that the related value is provided in the immediately preceding period of control, that is, the immediately preceding execution cycle of the program. The variable LPF block 41 receives information of the immediately preceding calculated rotational angle θf(n−1) from the block 42 which is referred to as the 2π correction block 42.

The 2π correction block 42 receives information of the filtering-resultant calculated rotational angle θf from the variable LPF block 41, and uses the calculated rotational angle θf in the next period of control (the next execution cycle of the program) as the immediately preceding angle θf(n−1). Also, the 2π correction block 42 receives the information of the calculated rotational angle θ from the rotational angle calculation block 15, and uses the calculated rotational angle θ as the current angle θ(n). The 2π correction block 42 calculates the value "θ(n)·θf(n−1)" and the value "θf(n−1)−θ(n)".

Figure 4:
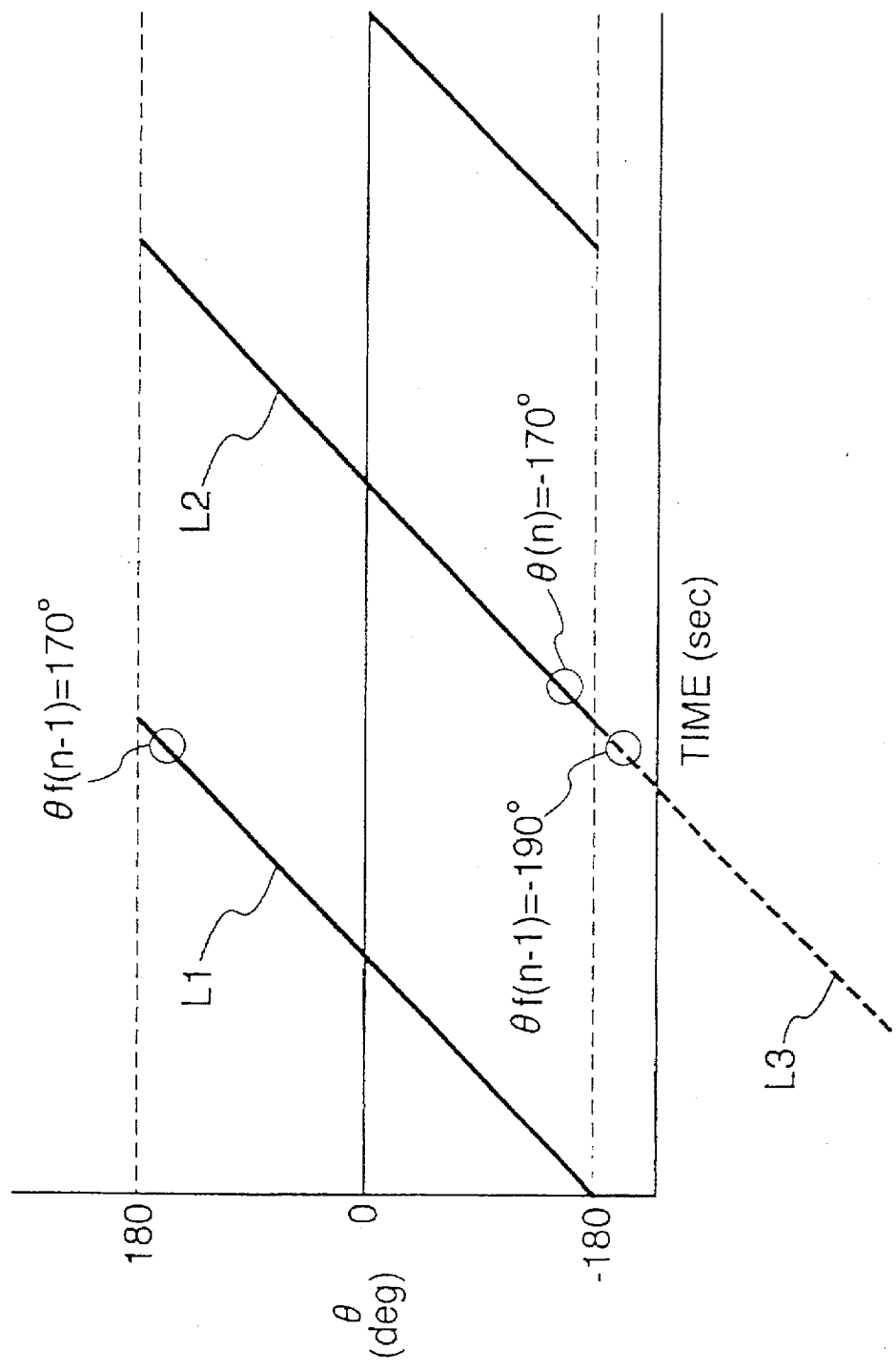
FIG. 4 is a time-domain diagram of a rotational angle of the rotor in a permanent magnet synchronous motor.

FIG. 4 shows a time-domain variation in the rotational angle θ of the rotor of the motor 6 which occurs when the rotor of the motor 6 continues to rotate in a normal direction (a positive or forward direction) at a fixed angular velocity. As shown by the solid straight lines in FIG. 4, the rotational angle θ of the rotor of the motor 6 linearly increases from −180° to +180° during every rotation period. The increase in the rotational angle θ of the rotor of the motor 6 periodically recurs. With respect to a variation in the rotational angle θ of the rotor of the motor 6, there are discontinuous points at ends of rotation periods. Specifically, the rotational angle θ of the rotor of the motor 6 discontinuously changes from +180° to −180° at ends of rotation periods. The values of the calculated rotational angle θf(n−1) and the values of the calculated rotational angle θ(n) distribute on the solid straight lines in FIG. 4 with certain dispersions corresponding to errors.

It is preferable that the period of reiterative control (the period of reiterative execution of the program) is set remarkably shorter than the period of rotation of the motor 6. Under this setting, the calculated rotational angles θf(n−1) and θ(n) available at moments near a discontinuous point and in opposite sides of the discontinuous point are dose to an angle of +180° and an angle of −180° respectively. In the example shown by FIG. 4, the calculated rotational angles θf(n−1) and θ(n) are equal to +170° and −170° respectively. Thus, the calculated rotational angles θf(n−1) and θ(n) have opposite signs respectively. Further, in the case of normal rotation or forward rotation of the motor 6, the value "θf(n−1)−θ(n)" is equal to a positive value near 2π (radian). On the other hand, in the case of reverse rotation of the motor 6, the value "θf(n−1)−θ(n)" is equal to a negative value near −2π (radian).

The 2π correction block 42 decides whether or not the value "θf(n−1)−θ(n)" is close to 2π (radian) by referring to a given threshold value equal to π. In addition, the 2π correction block 42 decides whether or not the value "θf(n−1)−θ(n)" is close to −2π (radian) by referring to a given threshold value equal to −π. Further, the 2π correction block 42 decides whether or not the value "θ(n)·θf(n−1)" is negative.

In the case where the value "θ(n)·θf(n−1)" is negative and the value "θf(n−1)−θ(n)" is greater than the threshold value π, the 2π correction block 42 decides that normal rotation of the motor 6 occurs, and that the immediately preceding angle θf(n−1) and the current angle θ(n) correspond to moments in opposite sides of a discontinuous point respectively. In this case, the 2π correction block 42 calculates the value "θf(n−1)−2π", and substitutes the value "θf(n−1)−2π" for the value "θf(n−1)" to implement the correction. In other words, the value "θf(n−1)" is updated or corrected to the value "θf(n−1)−2π".

In the case where the value "θ(n)·θf(n−1)" is negative and the value "θf(n−1)−θ(n)" is smaller than the threshold value −π, the 2π correction block 42 decides that reverse rotation of the motor 6 occurs, and that the immediately preceding angle θf(n−1) and the current angle θ(n) correspond to moments in opposite sides of a discontinuous point respectively. In this case, the 2π correction block 42 calculates the value "θf(n−1)+2π", and substitutes the value "θf(n−1)+2π" for the value "θf(n−1)" to implement the correction. In other words, the value "θf(n−1)" is updated or corrected to the value "θf(n−1)+2π".

In the case where the previously-indicated conditions are not satisfied, the 2π correction block 42 decides that the immediately preceding angle θf(n−1) and the current angle θ(n) do not correspond to moments in opposite sides of a discontinuous point respectively. In this case, the 2π correction block 42 does not execute the correction.

The previously-indicated equation (2) provides a weighted mean between the current angle θ(n) and the immediately preceding angle θf(n−1). As previously described, in the case where the immediately preceding angle θf(n−1) and the current angle θ(n) correspond to moments in opposite sides of a discontinuous point respectively during normal rotation of the motor 6, the correction by the block 42 uses the value "θf(n−1)−2π" as the value "θf(n−1)". Accordingly, a weighted mean between the angles θ(n) and θf(n−1) are available on the trajectory (the locus) of the rotational angle of the rotor of the motor 6. In the example shown by FIG. 4, the value "θf(n−1)−2π" is equal to 170°−360°, that is, −190°. Further, the angle θf(n−1) is corrected to −190°. Thus, the moment corresponding to the angle θf(n−1) is moved from the straight line L1 to a point on a past-side extension of the straight line L2 by the correction, and the filtering-resultant rotational angle θf(n) is calculated by referring to the previously-indicated equation (2). Accordingly, the filtering-resultant rotational angle θf(n) exists in the range of −190° to −170°.

The previously-indicated filter constant "a" is varied in accordance with the calculated angular velocity ωf so that the width of the pass band of the low pass filter provided by the block 41 depends on the calculated angular velocity ωf. Specifically, in the case where the angular velocity of the rotor of the motor 6 is lower than 30 rpm, the filter constant "a" is set to 30 which corresponds to a narrow pass band width. In the case where the angular velocity of the rotor of the motor 6 is between 30 rpm and 200 rpm, the filter constant "a" is set to 15 which corresponds to an intermediate pass band width. In the case where the angular velocity of the rotor of the motor 6 is equal to or higher than 200 rpm, the filter constant "a" is set to 2 which corresponds to a wide pass band width.

The variable LPF block 41 suppresses an error in the calculation of the rotational angle. In the case where the rotor of the motor 6 rotates at a low speed, the width of the pass band of the low pass filter provided by the block 41 is narrow so that ripple components are removed from the calculated rotational angle θf. Thus, the resultant rotational angle θf calculated by the block 41 is stable and ripple-free. In the case where the rotor of the motor 6 rotates at a high speed, the width of the pass band of the low pass filter provided by the block 41 is wide so that the delay of the phase of the calculated rotational angle θf is suppressed. In addition, a moderate ripple-suppressing effect is available.

The block 12 which is also referred to as the coordinate transformation block 12 receives the information of the phase currents ix and iy from the 3-phase/2-phase conversion block 11. As previously described, the phase currents ix and iy are defined in the stationary orthogonal coordinate system x-y. In addition, the coordinate transformation block 12 receives the information of the calculated rotational angle θf from the variable LPF block 41. The coordinate transformation block 12 uses the variable θ as an indication of the calculated rotational angle θf. The coordinate transformation block 12 changes the phase currents ix and iy into phase currents id and iq in the rotational orthogonal coordinate system d-q by referring to the following equation.

$$\begin{bmatrix} iy \\ ix \end{bmatrix} = \begin{bmatrix} \cos\theta & -\sin\theta \\ \sin\theta & \cos\theta \end{bmatrix} \begin{bmatrix} id \\ iq \end{bmatrix} \quad (3)$$

The coordinate transformation block 12 informs the blocks 13 and 22 of the phase currents id and iq.

The block 13 which is also referred to as the angular velocity calculation block 13 calculates the angular velocity ω from the phase currents id and iq by referring to the following equation.

$$\omega = \frac{Vq - (Rd + pLq)iq}{\phi f + Ldid} \quad (4)$$

where Vq denotes the voltage related to the q axis in the rotational coordinate system d-q; Rd denotes the winding resistance related to the d axis of the coordinate system d-q in an equivalent circuit of the motor 6; Ld and Lq denote the winding inductances related to the d axis and the q axis of the coordinate system d-q respectively; φf denotes the rotor magnetic flux; and p denotes a differential operator (d/dt). The angular velocity calculation block 13 receives information of the voltage Vq from the block 22 which is also referred to as the current control block 22.

The fixed LPF block 14 receives information of the calculated angular velocity ω from the angular velocity calculation block 13. The fixed LPF block 14 corrects the calculated angular velocity ω into a correction-resultant angular velocity ωf (a filtering-resultant angular velocity ωf) through processing which corresponds to a low pass filter. The fixed LPF block 14 removes ripple components from the calculated angular velocity ω. The fixed LPF block 14 informs the rotational angle calculation block 15, the variable LPF block 41, and the current control block 22 of the filtering-resultant angular velocity ωf.

The block 21 which is also referred to as the command current generation block 21 receives a signal representative of a command torque (a target torque) from a suitable device external with respect to the control unit 3. The command current generation block 21 determines command currents id* and iq* in response to the command torque. The command current generation block 21 informs the current control block 22 of the command currents id* and iq*.

The current control block 22 calculates two command phase voltages Vd and Vq which are defined in the rotational coordinate system d-q. Specifically, the command phase voltages Vd and Vq are calculated from the command currents id* and iq* according to the following equations.

$$Vd = (Kdp + Kdi/s)(id* - id) - \omega fLqiq \quad (5)$$

$$Vq = (Kqp + Kqi/s)(iq* - iq) + \omega fLdid + \omega f\phi f \quad (6)$$

where Kdp and Kqp denote proportion gains related to the d axis and the q axis respectively, and Kdi and Kqi denote integral gains related to the d axis and the q axis respectively. The equations (5) and (6) represent Laplace transforms using s as a variable. As shown in the equations (5) and (6), the command phase voltages Vd and Vq include proportion and integral terms, that is, PI terms corresponding to the current deviations (id*-id) and (iq*-iq).

The coordinate transformation block 23 receives information of the command phase voltages Vd and Vq from the current control block 22. In addition, the coordinate transformation block 23 receives the information of the calculated rotational angle θf from the variable LPF block 41. The coordinate transformation block 23 uses the variable θ as an indication of the calculated rotational angle θf. The coordinate transformation block 23 changes the command phase voltages Vd and Vq into command phase voltages Vx and Vy in the stationary orthogonal coordinate system x-y by referring to the following equation.

$$\begin{bmatrix} Vy \\ Vx \end{bmatrix} = \begin{bmatrix} \cos\theta & -\sin\theta \\ \sin\theta & \cos\theta \end{bmatrix} \begin{bmatrix} Vd \\ Vq \end{bmatrix} \quad (7)$$

The block 24 which is also referred to as the 2-phase/3-phase conversion block 24 receives information of the command phase voltages Vx and Vy from the coordinate transformation block 23. The 2-phase/3-phase conversion block 24 changes the two command phase voltages Vx and Vy into three command phase voltages VU, VV, and VW. The 2-phase/3-phase conversion block 24 informs the PWM block 25 of the three command phase voltages VU, VV and VW.

Figure 5:
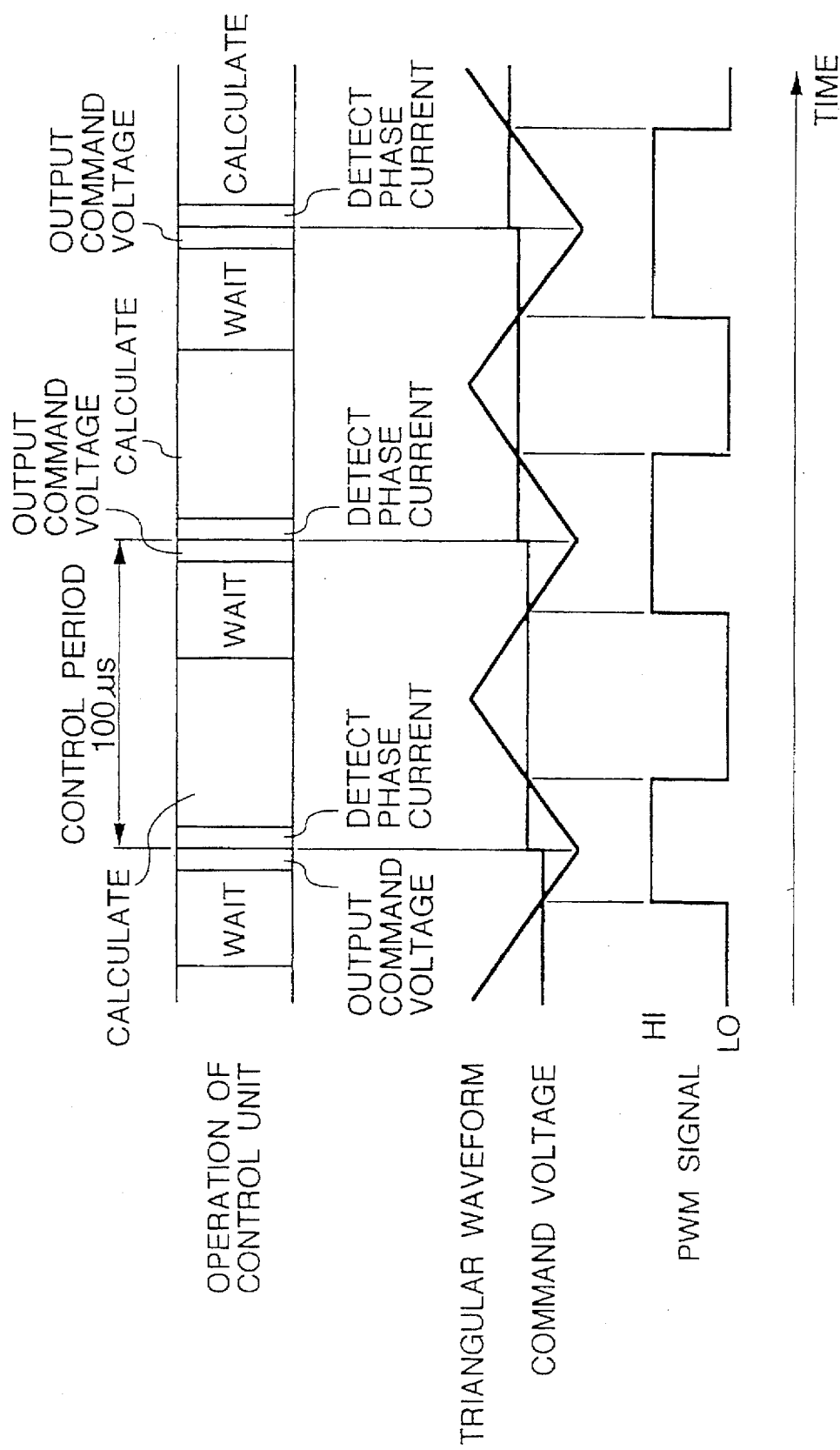
FIG. 5 is a time-domain diagram of the state of operation of the control unit and various signals in the apparatus of FIG. 1.

As shown in FIG. 5, the operation of the control unit 3 sequentially and cyclically changes among a phase current detecting state, a calculating state, a waiting state, and a command voltage outputting state. One cycle of the operation of the control unit 3, that is, the period of reiterative control, is equal to a given time interval, for example, 100 μs. A head of every cycle of the operation of the control unit 3 corresponds to the state for detecting or accepting the information of the phase currents iU and iW. The phase current detecting state is successively followed by the calculating step and the waiting step. After the waiting step, there occurs the state for outputting information of the command phase voltages VU, VV, and VW.

It is preferable that the input/output port in the control unit 3 contains D/A converters which change digital versions of the command phase voltages VU, VV, and VW into analog versions thereof. As shown in FIG. 5, each of the analog command phase voltages VU, VV, and VW is compared with a triangular waveform voltage, being converted into a PWM waveform signal. The triangular waveform voltage has a period equal to the period of reiterative control. The PWM waveform signal agrees with a binary energization signal which depends on the result of the previously-indicated comparison. The control unit 3 generates PWM waveform signals in response to the command phase voltages VU, VV, and VW respectively. The control unit 3 outputs the PWM waveform signals (the energization signals) to the inverter 5 as control signals.

For example, the motor 6 is a permanent magnet synchronous motor of a 4-pole flush (embedded) type which has a rating output power of 400 W, a rating drive current of 5

Figure 6:
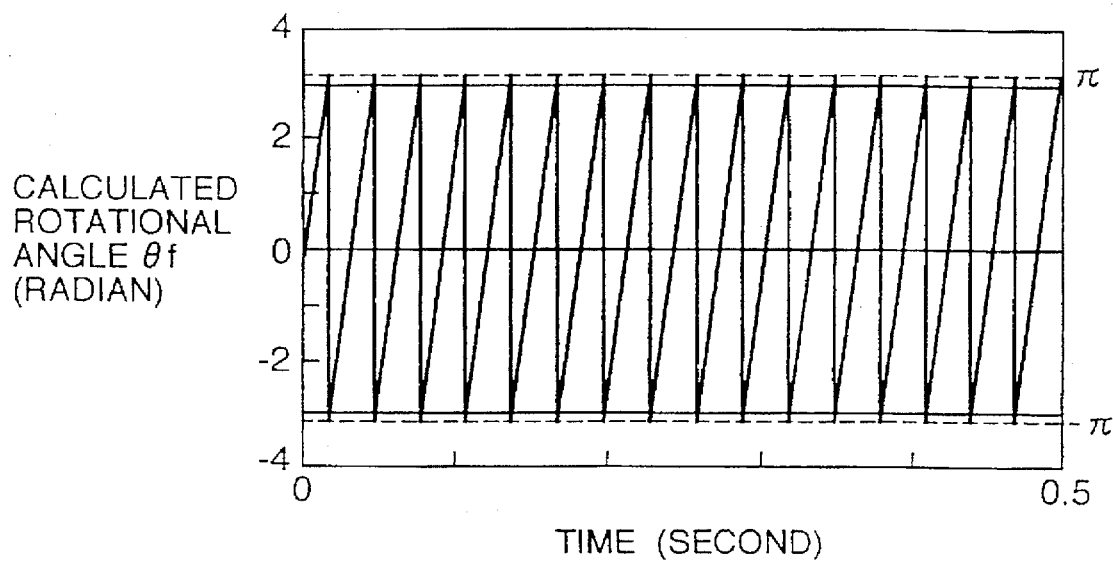
FIG. 6 is a time-domain diagram of a filtering-resultant rotational angle which is calculated in the apparatus of FIG. 1 during drive of the motor at a high angular velocity.
Figure 7:
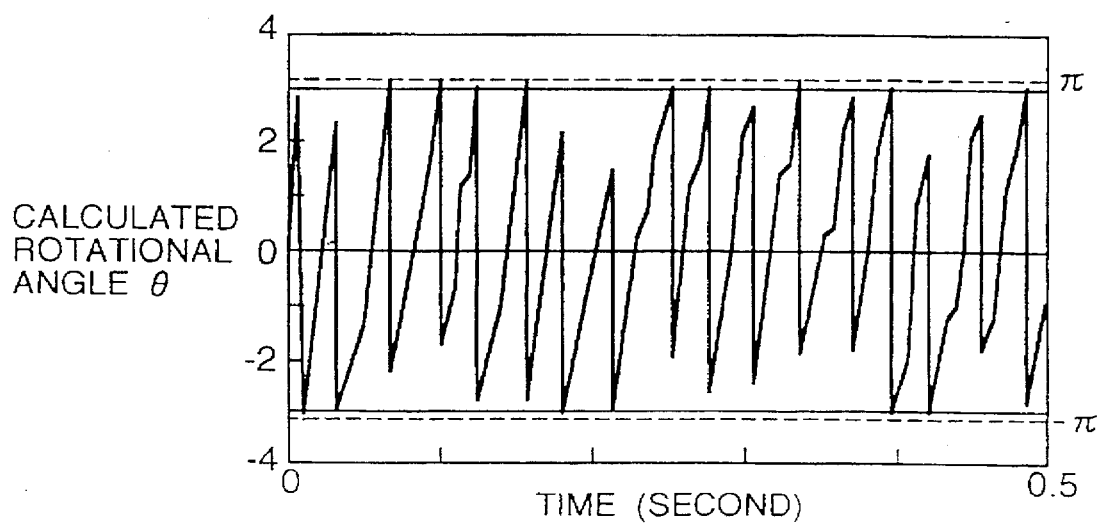
FIG. 7 is a time-domain diagram of a calculated rotational angle which occurs during drive of the motor at the high angular velocity.
Figure 8:
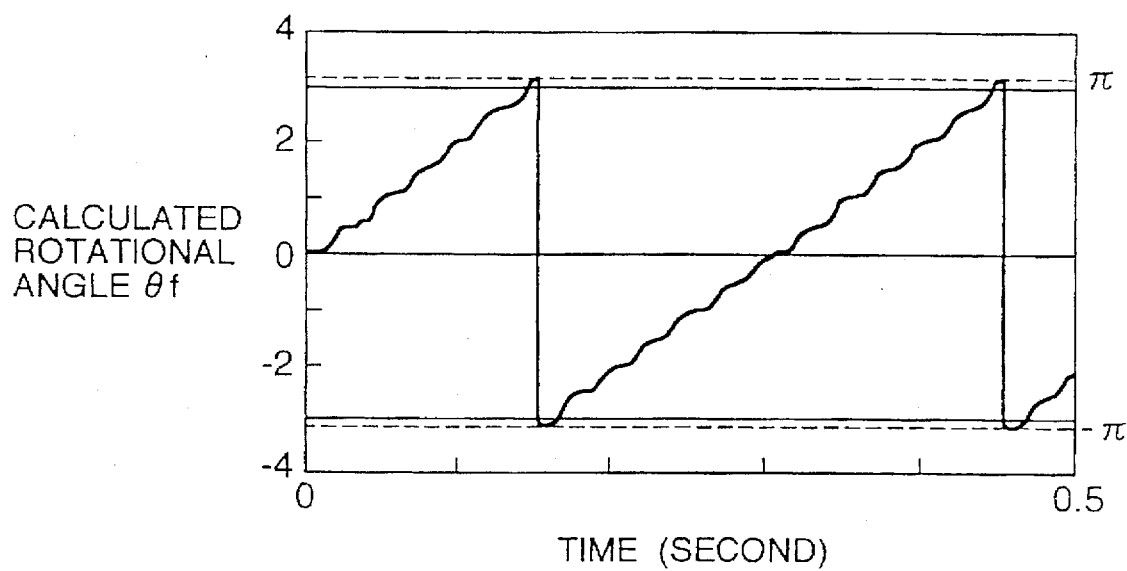
FIG. 8 is a time-domain diagram of a filtering-resultant rotational angle which is calculated in the apparatus of FIG. 1 during drive of the motor at a low angular velocity.
Figure 9:
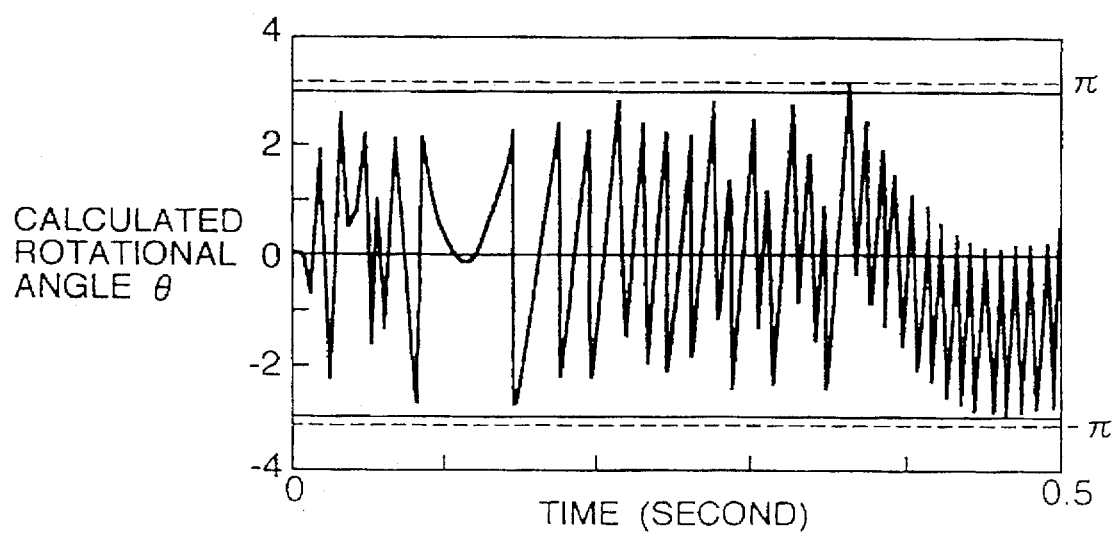
FIG. 9 is a time-domain diagram of a calculated rotational angle which occurs during drive of the motor at the low angular velocity.

A, and a rating rotational velocity of 1,000 rpm. In the case where the command torque is equal to 1.9 Nm and the motor 6 remains driven at an angular velocity of 1,000 rpm, the filtering-resultant rotational angle θf increases at substantially a constant rate as shown in FIG. 6. On the other hand, the calculated rotational angle θ increases at varying rates as shown in FIG. 7. In the case where the command torque is equal to 0.5 Nm and the motor 6 remains driven at an angular velocity of 100 rpm, the filtering-resultant rotational angle θf increases at substantially a constant rate as shown in FIG. 8. On the other hand, the calculated rotational angle θ increases at remarkably varying rates as shown in FIG. 9. As understood from FIGS. 6, 7, 8, and 9, the filtering-resultant rotational angle θf accurately indicates the actual rotational angle of the rotor of the motor 6. This enables accurate torque control of the motor 6.

As previously described, the filter constant "a" used by the variable LPF block 41 is changed among three different values in response to the calculated angular velocity ωf. The filter constant "a" may be changed among two, four, or more different values. The filter constant "a" may also be continuously varied in accordance with the calculated angular velocity ωf.

The variable LPF block 41 may be replaced by a full-hardware variable low pass filter. The fixed LPF block 14 may be replaced by a full-hardware fixed low pass filter. The motor 6 may have windings of four or more phases.

As previously described, the 2π correction block 42 executes the decision about the value "θf(n−1)−θ(n)" by using the threshold values equal to π and −π respectively. The threshold values may be different from π and −π.

Second Embodiment

Figure 10:
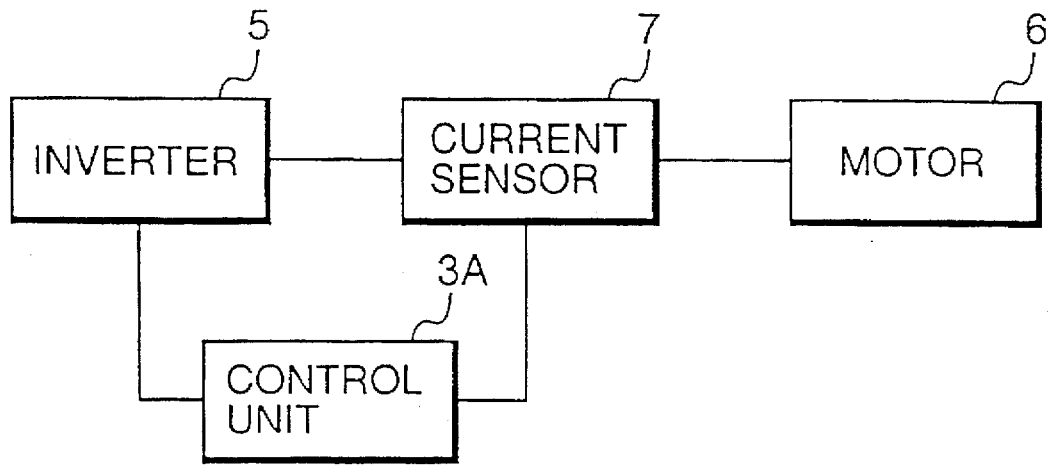
FIG. 10 is a block diagram of a sensor-less control apparatus for a permanent magnet synchronous motor according to a second embodiment of this invention.

FIG. 10 shows a second embodiment of this invention which is similar to the embodiment of FIG. 1 except that a control unit 3A replaces the control unit 3 of FIG. 1.

Figure 11:
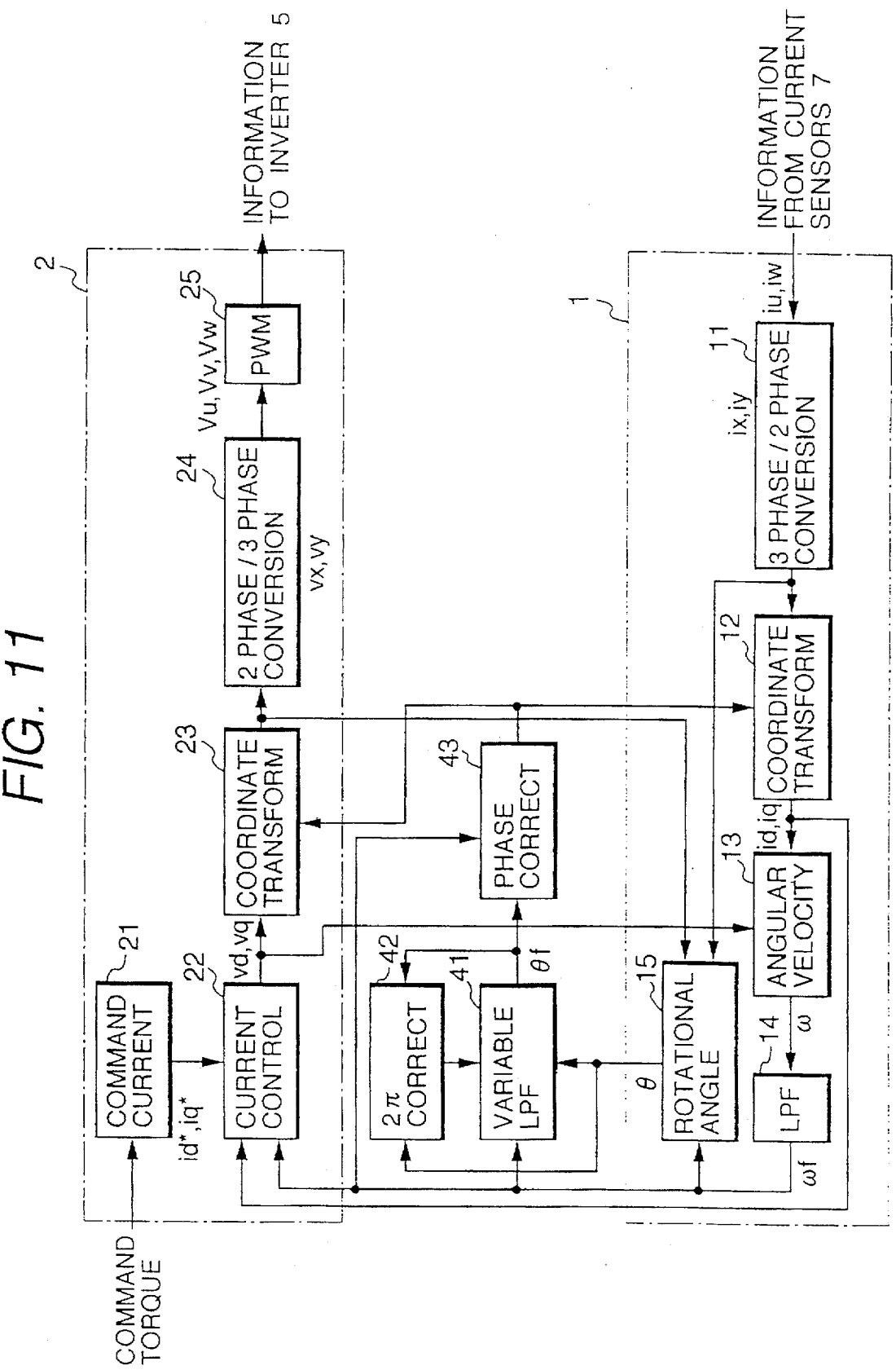
FIG. 11 is a diagram of the flow of operation of a control unit in FIG. 10.

FIG. 11 shows the flow of functions of the control unit 3A. With reference to FIG. 11, there is a newly added block 43 which is also referred to as a phase correction block 43. The phase correction block 43 receives information of a filtering-resultant rotational angle θf from a variable LPF block 41. Also, the phase correction block 43 receives information of a filtering-resultant angular velocity ωf from a fixed LPF block 14.

The variable LPF block 41 provides a delay which causes an error in the rotational angle θf. The phase correction block 43 cancels such an error in response to the angular velocity ωf, thereby correcting the rotational angle θf into an error-free rotational angle (a correction-resultant rotational angle). The phase correction block 43 informs coordinate transformation blocks 12 and 23 of the error-free rotational angle for the rotational angle θf.

Figure 12:
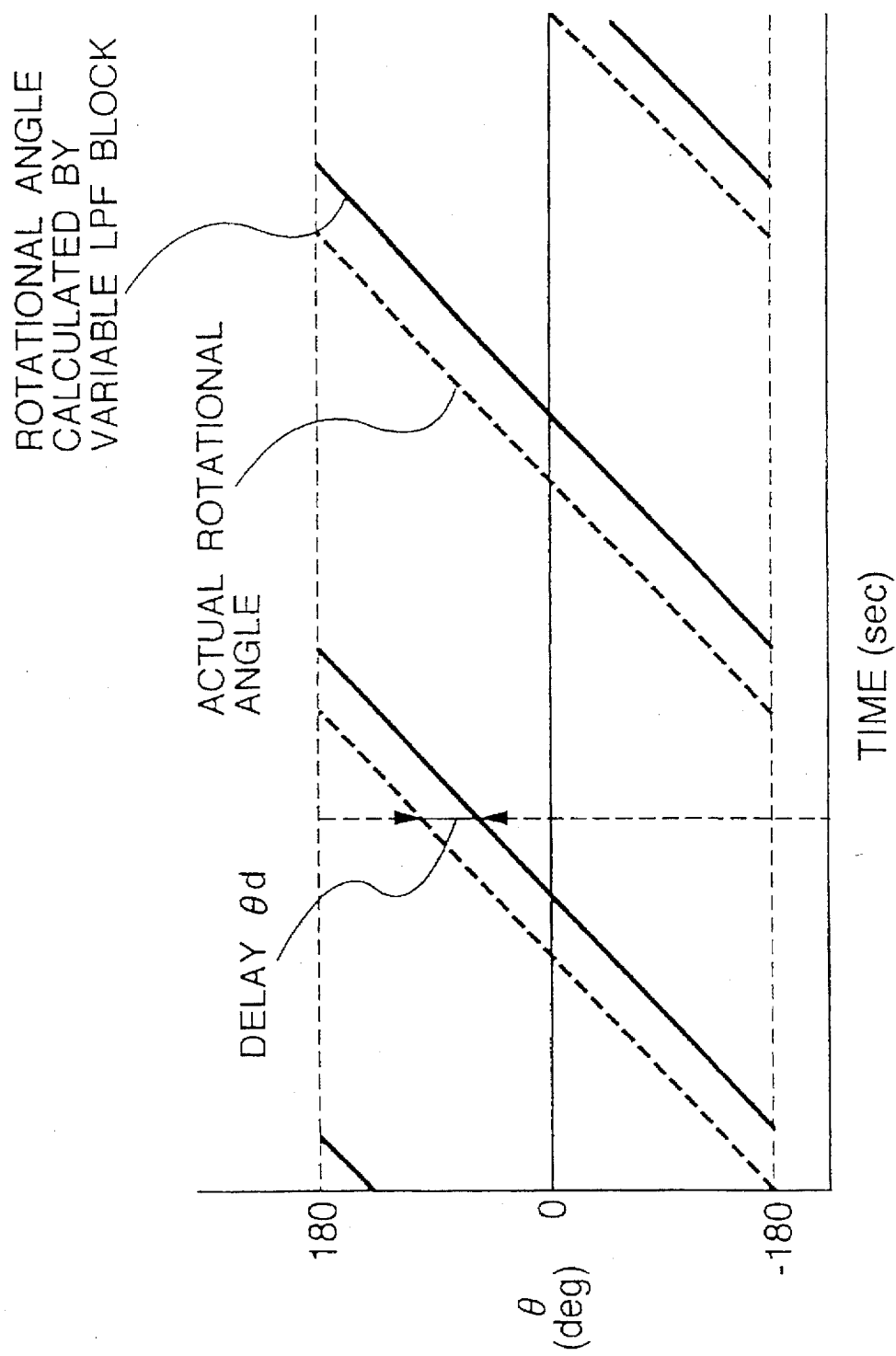
FIG. 12 is a time-domain diagram of an actual rotational angle and a calculated rotational angle of the rotor in a permanent magnet synchronous motor.

The actual rotational angle of the rotor of the motor 6 increases as denoted by the broken lines in FIG. 12 while the rotational angle θf calculated by the variable LPF block 41 increases as denoted by the solid lines in FIG. 12. The actual rotational angle linearly changes from −180° to +180° during every period of rotation of the motor 6. This change in the actual rotational angle periodically recurs.

Since the calculated rotational angle θf has a term including a a value provided in an immediately preceding period of reiterative control (see the equation (2)), the calculated rotational angle θf delays from the actual rotational angle by a certain time lag as shown in FIG. 12. The delay is now denoted by θd. The delay θd is proportional to a variation in the rotational angle θf which occurs during one period of reiterative control. Thus, the delay θd is proportional to the value ωf·Δt where Δt denotes one period of reiterative control. In addition, the delay θd is proportional to a filter constant "a" used in the variable LPF block 41 which corresponds to a weighting coefficient related to a 1-order delay component θf(n−1) in the equation (2). Accordingly, a corrective value for the delay θd is set to the value a·ωf·Δt.

The angular velocity ωf is positive and negative during normal rotation (forward rotation) and reverse rotation of the rotor of the motor 6 respectively. Therefore, the corrective value a·ωf·Δt is positive and negative during normal rotation and reverse rotation of the rotor of the motor 6 respectively. The phase correction block 43 adds the corrective value a·ωf·Δt to the calculated rotational angle θf, thereby updating or correcting the calculated rotational angle θf into a new rotational angle θf (a correction-resultant rotational angle θf). As previously described, the phase correction block 43 informs the coordinate transformation blocks 12 and 23 of the correction-resultant rotational angle, that is, the error-free rotational angle.

Since an error of the calculated rotational angle θf from the actual rotational angle is canceled in this way, it is possible to implement accurate torque control of the motor 6.

As previously described, the delay corrective value used by the phase correction block 43 is equal to a·ωf·Δt. The delay corrective value may be equal to the calculated angular velocity ωf multiplied by a given coefficient.

Third Embodiment

Figure 13:
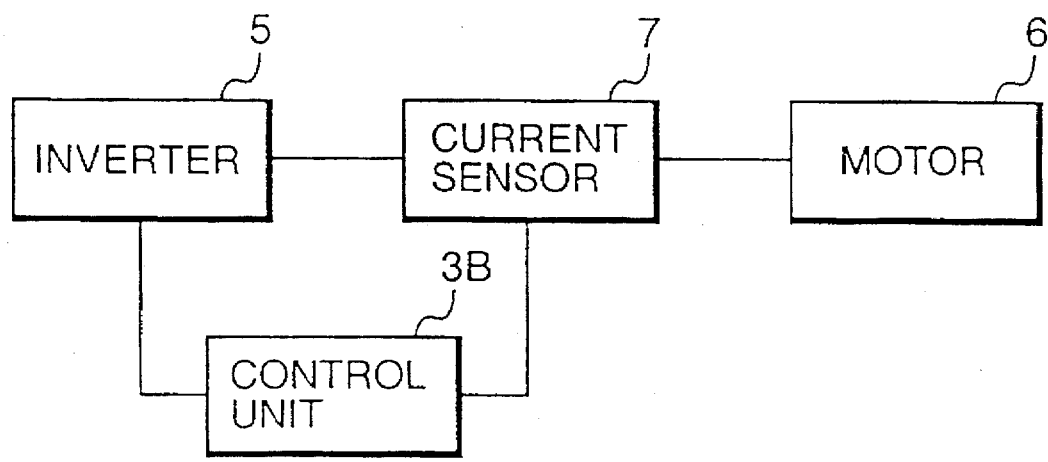
FIG. 13 is a block diagram of a sensor-less control apparatus for a permanent magnet synchronous motor according to a third embodiment of this invention.

FIG. 13 shows a third embodiment of this invention which is similar to the embodiment of FIG. 1 except that a control unit 3B replaces the control unit 3 of FIG. 1.

Figure 14:
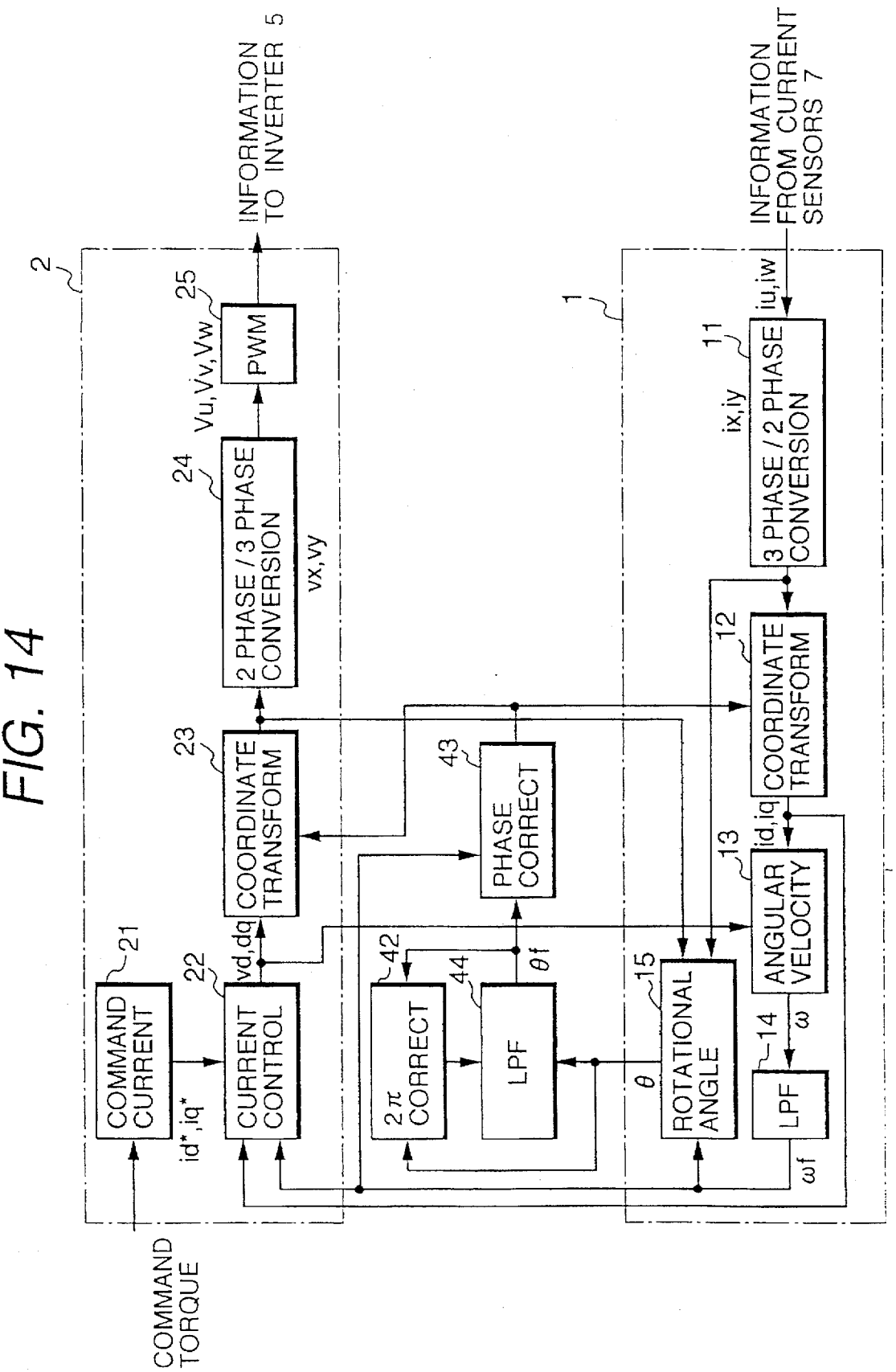
FIG. 14 is a diagram of the flow of operation of a control unit in FIG. 13.

FIG. 14 shows the flow of functions of the control unit 3B. With reference to FIG. 14, there is a fixed low pass filter block (a fixed LPF block) 44 which replaces the variable LPF block 41 in FIG. 2. The fixed LPF block 44 uses a fixed filter constant "a" which is independent of a calculated angular velocity ωf. The fixed LPF block 44 provides a digital filter equivalent to an analog low pass filter of a 1-order delay type. It is preferable to predetermine the filter constant "a" in accordance with a desired range of the angular velocity of a motor 6. Since the filter constant "a" is fluted, the pass band of the low pass filter provided by the fixed LPF block 44 remains unchanged independent of the calculated angular velocity ωf. In the case where the filter constant "a" is equal to 15, good control characteristics are available at a rotor angular velocity in the range of 30 rpm to 200 rpm. It is preferable to preset the filter constant "a" to an optimal value when the motor 6 is continuously operated at a given angular velocity.

With reference to FIG. 14, there is a phase correction block 43 similar to that in FIG. 11. As previously described, the phase correction block 43 uses a delay corrective value (a·ωf·Δt) which depends on the calculated angular velocity ωf. In the case where a desired rage of the rotor angular velocity is narrow or the rotor angular velocity is fixed, the delay corrective value may be independent of the calculated angular velocity ωf.

What is claimed is:

1. A position sensor-less control apparatus for a permanent magnet synchronous motor having multiple-phase armature windings and a rotor, the apparatus comprising:

first means for calculating a present rotational angle and an angular velocity of the rotor from phase currents and phase voltages of the armature windings, and from a filtering-resultant rotational angle;

second means for correcting the present rotational angle calculated by the first means into said filtering-resultant rotational angle, and for feeding back said filtering-resultant rotational angle to the first means;

third means contained in the second means for low-pass-filtering the present rotational angle calculated by the first means and changing the present rotational angle into said filtering-resultant rotational angle in a manner dependent upon a previous rotational angle calculated by said first means prior to calculating said present rotational angle;

fourth means contained in the second means for, in cases where a previous filtering-resultant rotational angle outputted from the third means and the present rotational angle calculated by the first means are not in a same period, correcting the previous filtering-resultant rotational angle into a correction-resultant previous rotational angle and enabling the third means to use the correction-resultant previous rotational angle as the previous rotational angle; and fifth means for controlling energization of the armature windings in response to at least the filtering-resultant rotational angle provided by the third means and the angular velocity calculated by the first means.

2. The position sensor-less control apparatus of claim 1, further comprising sixth means for adding a corrective value to the filtering-resultant rotational angle outputted from the second means, the corrective value being proportional to the angular velocity calculated by the first means.

3. The position sensor-less control apparatus of claim 1, wherein the third means uses a filter constant which depends on the present angular velocity calculated by the first means.

4. The position sensor-less control apparatus of claim 1, wherein the fourth means is operative for, in cases where the previous rotational angle and the present rotational angle calculated by the first means are not in a same period between $-\pi$ radian and $\pi$ radian, adding $-2\pi$ radian to the previous rotational angle for normal rotation of the rotor and adding $2\pi$ radian to the previous rotational angle for reverse rotation of the rotor.

5. The position sensor-less control apparatus of claim 1, wherein the third means comprises a digital filter equivalent to an analog filter of a 1-order delay type.

6. A position sensor-less control apparatus for a permanent magnet synchronous motor having multiple-phase armature windings and a rotor, the apparatus comprising:

first means for detecting phase currents which flow through the armature windings;

second means for estimating an angular velocity of the rotor from at least the phase currents detected by the first means, and generating a first signal representing the estimated angular velocity;

third means for correcting the first signal into a second signal through given signal processing which corresponds to a low pass filter;

fourth means for estimating a rotational angle of the rotor from at least the phase currents detected by the first means, and generating a third signal representing the estimated rotational angle;

fifth means for correcting the third signal into a fourth signal through given signal processing which corresponds to a low pass filter;

sixth means for controlling the phase currents in response to the second signal and the fourth signal;

seventh means for deciding whether or not the third signal and the fourth signal are in a predetermined relation; and eighth means for controlling the correcting by the fifth means in response to a result of the deciding by the seventh means.

7. The position sensor-less control apparatus of claim 6, further comprising ninth means for controlling the correcting by the fifth means in response to the second signal.

* * * * *